UNITED STATES PATENT OFFICE.

RICHARD SEIFERT, OF UNION HILL, NEW JERSEY.

ALUMINUM-SOLDER.

1,052,693.  Specification of Letters Patent.  Patented Feb. 11, 1913.

No Drawing.  Application filed November 22, 1912. Serial No. 732,869.

*To all whom it may concern:*

Be it known that I, RICHARD SEIFERT, a subject of the Emperor of Germany, residing at Union Hill, Hudson county, State of New Jersey, have invented certain new and useful Improvements in Aluminum-Solders, of which the following is a full, clear, and exact description.

My invention consists in an improved aluminum solder, that is to say, a solder which will readily connect or hold articles or parts composed of aluminum metals, and my invention has for its object to provide a comparatively inexpensive aluminum solder which will be efficient in use.

In the manufacture of my improved aluminum solder, in order to manufacture, say one pound of the solder, I take approximately 38% pure tin, 32% phosphor tin, 30% pure zinc, and 20% resin, and melt the mixture in a suitable crucible, until it is thoroughly mixed. During the melting process, the mixture is thoroughly stirred.

With my improved solder, I can solder any aluminum metal quickly and efficiently, and no acids are needed to apply the solder. It is applied in the same manner as ordinary lead solder.

In applying the solder, the aluminum is preferably scraped and tinned over with my solder, and then my solder is applied by a soldering iron, or a blow-pipe, in the usual manner.

With my improved solder, I can also solder other metals to aluminum, such as brass or bronze, in which case the aluminum is first tinned by my solder, as above described, but the brass or bronze is first treated with the usual acid flux, and then tinned with my solder, whereupon the aluminum and other metal can be joined together with my solder, as above described.

Having now described my invention, what I claim and desire to secure by Letters Patent, is:

An improved aluminum solder, comprising a mixture of approximately 38 per cent. pure tin, 32 per cent. phosphor-tin, and 30 per cent. pure zinc, substantially as set forth.

Signed at New York city, N. Y., this 21 day of Nov. 1912.

RICHARD SEIFERT.

Witnesses:
 MAURICE BLOCK,
 EDWARD A. JARVIS.